United States Patent
Hügel

(10) Patent No.: US 12,224,476 B2
(45) Date of Patent: Feb. 11, 2025

(54) HIGH FREQUENCY ASSEMBLY

(71) Applicant: HUBER+SUHNER AG, Herisau (CH)

(72) Inventor: Ulf Hügel, Herisau (CH)

(73) Assignee: HUBER+SUHNER AG, Herisau (CH)

( * ) Notice: Subject to any disclaimer, the term of this patent is extended or adjusted under 35 U.S.C. 154(b) by 352 days.

(21) Appl. No.: 17/775,961

(22) PCT Filed: Nov. 17, 2020

(86) PCT No.: PCT/EP2020/082360
§ 371 (c)(1),
(2) Date: May 11, 2022

(87) PCT Pub. No.: WO2021/099300
PCT Pub. Date: May 27, 2021

(65) Prior Publication Data
US 2022/0393331 A1 Dec. 8, 2022

(30) Foreign Application Priority Data
Nov. 21, 2019 (CH) .................................. 01470/19

(51) Int. Cl.
H01P 3/16 (2006.01)
H01P 1/161 (2006.01)
H04B 10/2507 (2013.01)

(52) U.S. Cl.
CPC ................ *H01P 3/16* (2013.01); *H01P 1/161* (2013.01); *H04B 10/2507* (2013.01)

(58) Field of Classification Search
CPC .... H01P 3/16; H01P 5/087; H01P 1/00; H01P 1/20309; H01P 3/081; H01P 3/082;
(Continued)

(56) References Cited

U.S. PATENT DOCUMENTS 9,373,878 B2 6/2016 Schuppener et al.
9,490,518 B1 11/2016 Herbsommer et al.
(Continued)

FOREIGN PATENT DOCUMENTS

DE 10 2015 105 657 A1 10/2016
EP 3 306 740 A1 4/2018

OTHER PUBLICATIONS

Van Thienen, Niles, et al., "Bidirectional Communication Circuits for a 120-GHz PMF Data Link in 40-nm CMOS," IEEE J of Solid-State Circuits, vol. 53, No. 7, Apr. 9, 2018, pp. 2023-2031.
(Continued)

*Primary Examiner* — Lincoln D Donovan
*Assistant Examiner* — Tyler J Pereny
(74) *Attorney, Agent, or Firm* — Pauley Erickson & Swanson

(57) ABSTRACT

A high-frequency assembly includes a cable with at least one dielectric waveguide fiber with a first end and an opposed second end. The high-frequency assembly includes a high-frequency circuit and an interface unit. The at least one dielectric waveguide fiber is at the first end operatively coupled with the high-frequency circuit via the interface unit. The interface unit is designed to inject a high-frequency signal into the dielectric waveguide fiber and/or to receive a high-frequency signal from the at least one dielectric waveguide fiber at the first end. The high-frequency signal has a first signal component of a first polarization direction and a second signal component of a second polarization direction, wherein the high-frequency assembly is designed to inject the first signal component and the second signal component
(Continued)

in a defined manner and/or to split a received high-frequency signal into the first signal component and the second signal component.

11 Claims, 2 Drawing Sheets

(58) Field of Classification Search
CPC ........ H01P 3/122; H01P 5/1007; H01P 5/107; H01P 1/161; H01P 3/18; H01P 5/08; H01Q 1/50; H01Q 1/24; H01Q 13/085; H01Q 15/14; H01Q 19/10; H01Q 21/28; H01L 2223/6677; H01L 2224/16227; H01L 2924/15321
See application file for complete search history.

(56) References Cited

U.S. PATENT DOCUMENTS

| | | | | |
|---|---|---|---|---|
| 9,571,183 | B2* | 2/2017 | Runyon | H01Q 1/1264 |
| 2010/0141543 | A1* | 6/2010 | Parekh | H01P 1/161 |
| | | | | 333/135 |
| 2013/0314289 | A1* | 11/2013 | Hoferer | H01P 1/182 |
| | | | | 333/137 |
| 2016/0064795 | A1 | 3/2016 | Chang et al. | |
| 2020/0021041 | A1* | 1/2020 | Artemenko | H01P 1/2138 |
| 2022/0085477 | A1* | 3/2022 | Karau | G02B 6/0096 |

OTHER PUBLICATIONS

Dolatsha, N., et al., "Fully packaged millimtrewave dielectric waveguide with multimodal excitation," Elect. Ltrs., IEE Stevenage, GB, vol. 51. No. 17, Aug. 20, 2015, pp. 1339-1341, XP006053248.
Meyer, Andre, et al., "Broadband Stacked-Patch Transition from Microstrip Line to Circular Dielectric Waveguide for Dual-Polarized Applications at W-Band Frequencies," 49th European Microwave Conference , Oct. 1, 2019, pp. 440-443, XP033642003.
Aflakian, N. et al., "Funcational Performance of a Millimeter Wave Square Holey Dielectric Waveguide," 2019 IEEE Radio and Wireless Symposium, Jan. 20, 2019, pp. 1-4.
Bo, Yu, et al., "Ortho-Mode Sub-THz Interconnect Channel for Planar Chip-to-Chip Communication," IEEE Transactions on Microwave Theory and Techniques, Dec. 22, 2017, vol. 66, No. 4, Dec. 22, 2017, pp. 1864-1873, XP055769002.
Van Thienen, N. et al., "An 18Gbps polymer microwave fiber (PMF) communication link in 40nm CMOS," ESSCIRC Conference 2016: 42nd European Solid-State Circuits Conference, IEEE, Sep. 12, 2016, pp. 483-486, XP032980912.
EPO (Riswijk, NL), English language version of the International Search Report, Form PCT/ISA/210, for International Application PCT/EP2020/082360, Feb. 15, 2021 (3 pages).

* cited by examiner

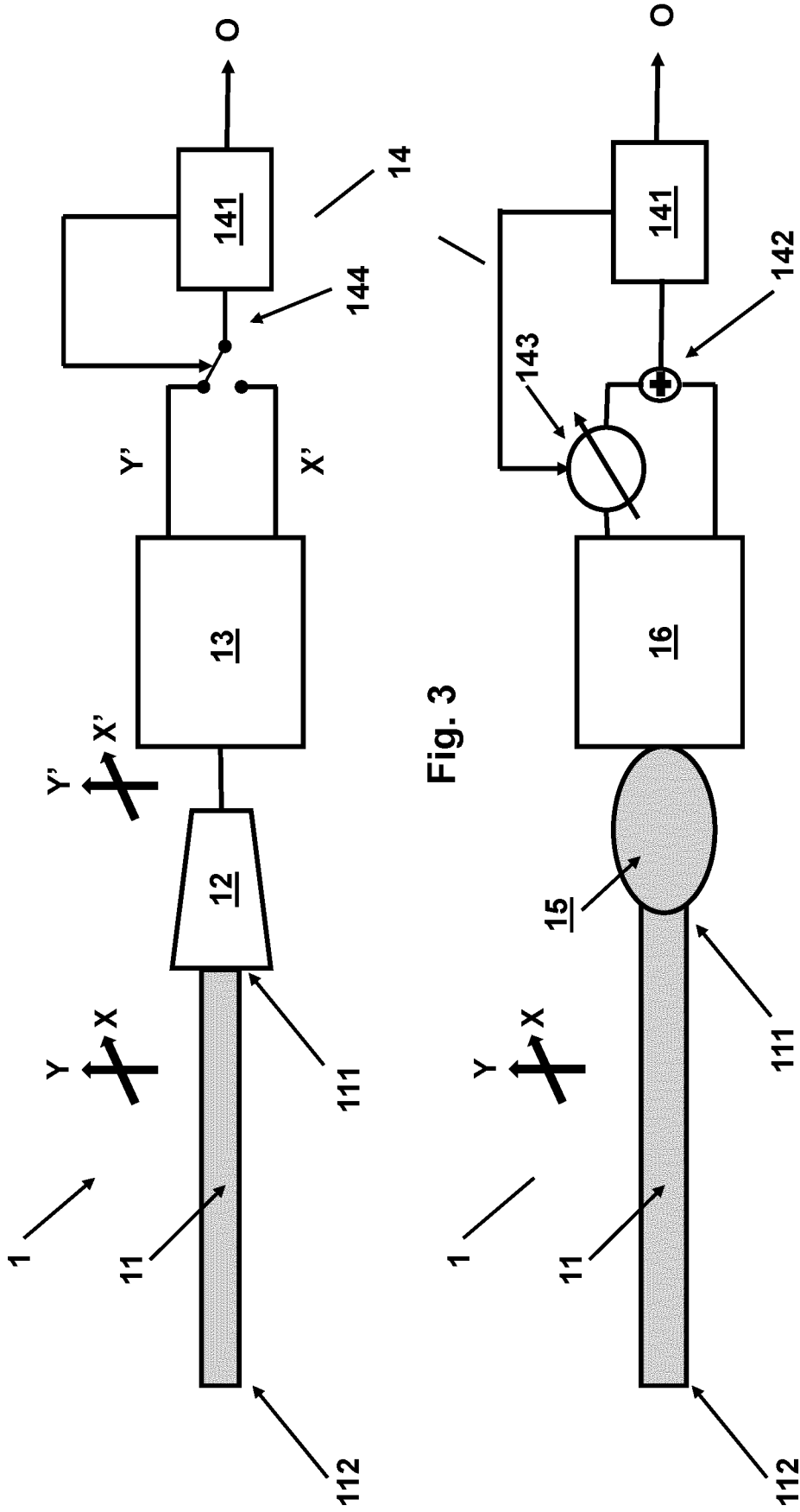

HIGH FREQUENCY ASSEMBLY

CROSS REFERENCE TO RELATED APPLICATION

This application is a National Phase filing in the United States, under 35 USC §371, of PCT International Patent Application PCT/EP2020/082360, filed on 17 Nov. 2020 which claims the priority of Swiss Patent Application CH 01470/19, filed 21 Nov. 2019.

These applications are hereby incorporated by reference herein in their entirety and is made a part hereof, including but not limited to those portions which specifically appear hereinafter.

BACKGROUND OF THE INVENTION

Field of the Invention

The present invention relates to high frequency assemblies with at least one dielectric waveguide fiber, in particular at least one polymer microwave fiber, and the coupling of the at least one fiber to a high-frequency circuit. The invention is particularly useful in the context of high speed data transmission devices and data links.

Discussion of Related Art

In the course of further development of high speed data transmission, dielectric waveguides and in particular polymer microwave fibers (PMFs) are gaining a particular interest. A main driver for this trend is, besides the continuous exponential growing demand for cost efficient high data transmission capacity, the improvement of silicon transistor technologies allowing to build fully integrated transceivers in one single die (MMIC). Such transceivers may operate in frequencies in the mm-wave band and beyond.

In this frequency range, traditional conductor based cables, such as paired lines or coaxial cables, generate high losses due to the increasing conductor losses caused by the skin effect. Cables that are based on waveguides can help to reduce those losses. In the case of pure dielectric-based waveguide cables the attenuation per meter could be reduced to values of about 2 . . . 8 dB per meter. Furthermore, the lack of galvanic contacts and significant lower sensitivity to mechanical alignment tolerances increase the attractiveness of such high speed data transmission links.

Particular aspects of such high speed data transmission links are addressed in US9373878B2, DE 102015105657A1, US2016064795A1, US9490518B1, EP3306740A1.

SUMMARY OF THE INVENTION

A common underlying assumption in PMF data transmission is that a-PMF-based waveguide cable maintains the polarization of an injected signal over its length. Particularly, in case of fibers respectively cores of non-rotation-symmetric cross section, it is generally assumed that the linear polarization would be maintained by the fiber. In case of rotation-symmetric cables, it is generally assumed that the circular polarization would be maintained by the cable. This is the case for ordinary metallic waveguides, where the fundamental mode TE10 is normally used for the data transmission and the electric filed strength vector is always perpendicular to the metallic walls of the waveguide.

However, when characterizing PMFs in a laboratory setup, unexpected effects could be observed. Even if using highly accurate and precise test adapters for the transition from the hollow waveguide ports of a network analyzer to the PMF and accordingly a transition from the fundamental mode TE10 (in the hollow waveguide port) to the fundamental mode HE11 (in the PMF) or vice versa, the S-parameters appear to vary in an unpredictable and non-reproducible manner. This variation could not be explained with imperfection such as inaccurate components, tolerances, misalignment and/or parasitic resonators.

The reason for this unexpected and undesired effect is in fact due to the PMF. Already small deviations and inhomogeneity that occur during production material anisotropy (e.g., due to the air bubble distribution in the polymer foam and the molecular orientation in the polymer) result in slight deviations of the electromagnetic wave propagation speed depending on the orientation of the electric field strength vector (E-vector) in the desired and favorable fundamental mode HE11. Similar effects are caused by temperature variations, mechanical stress, twisting and/or bending of the fiber, which will result in the field concentration being displaced out of the center of the cable.

It is noted that the orientation of the E-vector of an electromagnetic wave in the fundamental mode HE11 can be expressed as superposition of two electromagnetic waves, both having the fundamental mode HE11 and having E-vectors (electric field strength vectors) that are oriented in perpendicular X- and Y-directions. The variation in the wave propagation speed as described before results in an initially linear polarization (where the E-vector has one linear component only) to be changed into an arbitrary elliptical polarization respectively an unpredictable change in the phase relation between the components of the E-vector in X— and Y direction. By way of example it can be found that a twisting of the cable by 10 degrees result in unacceptable ripples and notches of the S-parameter over the desired frequency band of operation, for example from 110 GHz to 140 GHz.

An ordinary rectangular electromagnetic waveguide port (e.g., of a network analyzer or in generally a high-frequency circuit) is designed to receive electromagnetic waves in the fundamental TE10 mode with linear polarization in only one particular orientation, i.e., direction of the E-vector, to allow a good matching with a connected waveguide. The before-described arbitrary elliptical polarization of the HE11 mode when using a PMF for signal transmission will transfer to a similar elliptical polarized TE10 mode signal in the waveguide port, causing a generally bad and varying matching between the PMF and the waveguide port. This results in a significant portion of the energy of the electromagnetic wave to reflected at the interface to the waveguide port. Further, the generally low losses of the PMF itself may ultimately result in multiple reflections. These reflections cause the before-described effects and the unsatisfying values of the S-parameters as mentioned.

In view of the before-described problems, it is an overall objective of the present invention to improve the state of the art regarding the signal transmission using dielectric waveguide fibers, in particular polymer waveguide fibers and their coupling to further components. Favorably, some or all of the before-mentioned problems are avoided fully or in part.

In an aspect, the overall objective is achieved by a high-frequency assembly respectively microwave assembly. The high-frequency assembly includes a cable, the cable including at least one dielectric waveguide fiber with a first end and an opposed second end. The high-frequency assembly further includes a high-frequency circuit, in particular an electronic high-frequency circuit and an interface unit. The at least one dielectric waveguide fiber is at the first end operatively coupled with the high-frequency circuit via the interface unit.

The interface unit is designed to inject a high-frequency signal into the dielectric waveguide fiber and/or to receive a high-frequency signal from the at least one dielectric waveguide fiber at the first end. The high-frequency signal has a first signal component of a first polarization direction and a second signal component of a second polarization direction. The high-frequency assembly is designed to inject the first signal component and the second signal component in a defined manner and/or to split a received high-frequency signal into the first signal component and the second signal component.

An injection of the first signal component and the second signal component in a defined manner means that the amplitudes respectively levels of the first and second signal component and/or the phasing between the first and second signal component is well defined and can be controlled. Both signal components that are injected into or received from the dielectric waveguide fiber may in particular be operated in the fundamental mode HE11.

In a further aspect, the overall objective is achieved by a method for transmitting a high-frequency signal via at least one dielectric waveguide fiber of a cable, the dielectric waveguide fiber having a first end and an opposed second end. The method includes injecting a high-frequency signal into the at least one dielectric waveguide fiber and/or to receiving a high-frequency signal from the at least one electro-magnetic waveguide fiber at the first end. The high-frequency signal has a first signal component of a first polarization direction and a second signal component of a second polarization direction. The method includes injecting the first signal component and the second signal component in a defined manner and/or splitting a received high-frequency signal into the first signal component and the second signal component.

The method may in particular be carried out using a high-frequency assembly according to any embodiment in accordance with the present disclosure and may comprise method steps inherent to such embodiments.

The high-frequency circuit may in some embodiments include a transmitter, receiver, filter, amplifier attenuator, or any combination thereof. Further in some embodiments, the high-frequency circuit includes one or more microwave semiconductor components. The high-frequency circuit may further include further high-frequency components, in particular waveguide elements, such as metallic waveguide elements, substrate integrated waveguides and/or microstrip lines. The high-frequency circuit may in some embodiments include a phase shifting and/or switching units as electric and/or waveguide devices. The second end of the dielectric waveguide fiber may be connected to a further high-frequency circuit.

In an embodiment, the at least one dielectric waveguide fiber is a polymeric microwave fiber (PMF). This type of embodiment is generally assumed in the following. It is noted that the cable can optionally include two or more dielectric microwave fibers that may each be coupled to a high-frequency circuit via a dedicated interface unit. Instead of a polymer, the at least one dielectric waveguide fiber may be made from other materials of similar characteristics, such as glass or ceramics.

In an embodiment, the first polarization direction and the second polarization direction are orthogonal to each other. Such orthogonal directions are in this document also indicated by "X" and "Y", respectively (for the HE11 mode) or "X" and "Y" (for the TE10 mode).

In an embodiment, the interface unit includes an orthomode transducer or a dual polarization antenna. Orthomode transducers (OMTs) are waveguide components generally known in the art and used for combining orthogonally polarized electromagnetic systems and/or to separating respectively splitting an electromagnetic signal into two orthogonal components. A dual polarization antenna is an antenna arrangement, for example in form of dipole antenna, slot antenna, Vivaldi antenna or patch antenna that is designed to transmit two electromagnetic signal in two orthogonal directions respectively to receive two electromagnetic signals of orthogonal direction. The two electromagnetic signals are guided to respectively from the antenna in two signal lines (e.g., striplines, substrate integrated waveguides, microstrip lines, coaxial lines).

In an embodiment, the high-frequency assembly includes a dielectric lens arranged at the connection of the first end and the interface arrangement. A dielectric lens may in particular be arranged at the first end of the dielectric waveguide fiber and serves as terminal element that terminate the dielectric waveguide fiber.

A Horn antenna provides a transition from the fundamental mode TE10 (in the hollow waveguide port) to the fundamental mode HE11 (in the PMF) or vice versa. A horn antenna may in particular be used in combination with an OTM. The horn antenna may be arranged between the fiber and the OTM, and radiate into respectively towards the OTM as receiving element. Similarly, a dielectric lens may be used in combination with a dual polarization antenna. The dielectric lens may be arranged between the fiber and the dual polarization antenna and radiate into respectively towards the dual polarization antenna as receiving element. The dielectric lens may be provided integrally with the horn antenna as an antenna component. Alternatively, the dual polarization antenna may be directly arranged adjacent to the fiber end.

In an embodiment, the high-frequency assembly is designed to evaluate a first signal level of the first signal component and a second signal level of the second signal component. Further in an embodiment, the high-frequency assembly is configured to feed the first signal component only or the second signal component only into a receiving circuit independence of the first signal level and/or the second signal level signal component. Further in an embodiment, the high-frequency assembly is configured to switch from feeding the first signal component only into the receiving circuit to feeding the second signal component only into the receiving circuit if the signal level of the first signal component falls beyond a signal level threshold and to from feeding the second signal component only into the receiving circuit to feeding the first signal component only into the receiving circuit if the signal level of the second signal component falls beyond a signal level threshold.

This circuit design is also referred to as Diversity receiver and be the high-frequency circuit or part of the high-frequency circuit it typically comprises a switching element that switches between the first signal component and the second signal component in dependence of their signal level. It may further comprise a comparison unit that is configured to compare the signal level that is fed into the receiving unit (being it the first or second signal level) with the signal level threshold and control the switching element accordingly. To ensure a stable system behavior and avoid unnecessary switching, the signal level threshold may be adaptive as explained below in the context of exemplary embodiments.

Since it is highly desired or even crucial to avoid (in the worst case multiple) reflections, a termination load is favorably provided that terminates the non-used signal path, i.e., the signal path of the first signal component if the second signal component is fed into the receiving circuit and vice versa. Further in an embodiment, the high-frequency assembly is configured to determine which of the first signal level and the second signal level is larger and feed the first signal component only into a receiving circuit if the first signal level is larger than the second signal level, or to alternatively feed the second signal component only into the receiving circuit if the second signal level is larger than the first signal level.

Generally, the signal energy is split between the two signal components, with the distribution between the first and second signal component depending on the arbitrary polarization. The before-described embodiments where only one of the signal components is fed into the receiving circuit can avoid that the received signal level drop below 50% or by bad chance even to zero. Since only part of the full energy of the original electromagnetic signal is utilized, however, this kind of embodiment is associated with a generally undesired attenuation of up to 3 dB. Favorably for this type of embodiment, the high-frequency assembly, in particular the high-frequency circuit, is designed to do the evaluation of the first signal level and/or of the second signal level of the second signal component as well as the switching in a continuous manner.

In an embodiment, the high-frequency assembly is designed to generate a combined signal from the received first signal component and the received second signal component by superimposing the first signal component and the second signal component with an adjustable phasing such that a combined signal level of the combined signal is maximum. For this type of embodiment, the before-mentioned unfavorable attenuation is avoided since the both the first and second signal component is utilized. The arbitrary elliptical polarization causes an unknown phase relation from 0° . . . 360° between the first and second signal component, so a phase shifting unit can hinder that in worst case both signals would be subtracted instead of added. The phase shifting is generally controlled in a favorably continuous manner by a receiving circuit.

In an embodiment, the electronics circuit includes a first receiving circuit and a second receiving circuit. The high frequency assembly is configured to feed the first signal component into the first receiving circuit, and to separately feed the second signal component into the second receiving circuit. The high-frequency assembly of this type of embodiment is further configured o superimpose a first output signal of the first receiving circuit and a second output signal of the second receiving circuit. For this type of embodiment, the first and second signal components are separately demodulated and digital converted by the two receiving circuits and superimposed afterwards in the digital domain In an embodiment, the high-frequency assembly is designed to determine a received signal level that is received at the second end and to control the amplitude and phase relation of the first signal component and the second signal component injected into the at least one dielectric waveguide fiber. The high frequency assembly of this type of embodiment is favorably designed to control the phase and amplitude relation between the first signal component and the second component such that the received signal level is maximum or close to maximum.

In the before described embodiments, the problem of an arbitrary and unpredictable elliptical polarization at the output side of the dielectric waveguide fiber is addressed at the output or receiving side, while the injection of the high-frequency signal at the input side may in principle be arbitrary respectively with any fixed polarization. For the last-described type of embodiment, in contrast the waveguide port of a receiving circuit may in principle be designed for any fixed polarization of the electromagnetic wave signal that is injected into the waveguide port. The feeding of the high-frequency signal at the input side is controlled with respect to the first signal level, the second signal level as well as the phasing between the signal components in a manner that a desired maximum signal level at the output is obtained. The injection of the high-frequency signal is accordingly controlled in a closed loop and favorably in a continuous manner.

In an embodiment, the high-frequency assembly is configured to transmit and receive simultaneously in a polarization duplex operation mode. For this type of embodiment, the receiving circuit is configured to evaluate an amplitude and phase relation of a first received signal and a second received signal, thereby determining a received effective polarization vector at the first end. The high-frequency assembly for this type of embodiment is further configured to calculate an orthogonal polarization vector to this received effective polarization vector and to inject a transmit signal into the at least one dielectric waveguide fiber at the first end, the further signal being polarized according to the orthogonal polarization vector.

An antenna, such as a horn antenna as mentioned before favorably receives the received signal with the received effective polarization vector and transmits the transmit signal with the orthogonal polarization vector.

For this type of embodiment, the received signal at the first end of the fiber (injected at the opposite second end of the fiber) and the transmit signal that is injected at the first end of the fiber (and accordingly received at the opposite second end of the fiber) can travel respectively propagate in opposite directions in the fiber without interfering. A maximum signal level can in this way be received at both the first and second end of the fiber.

BRIEF DESCRIPTION OF SEVERAL VIEWS OF THE DRAWINGS

FIG. 3 shows a still further embodiment of a high-frequency assembly in a schematic functional view; and FIG. 4 shows a still further embodiment of a high-frequency assembly in a schematic functional view.

Figure 1:
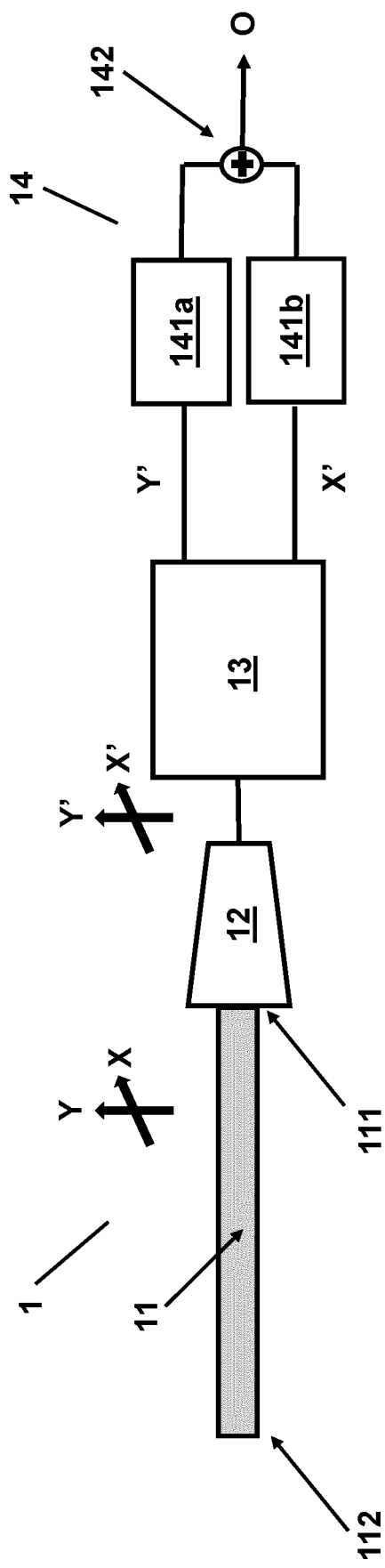
FIG. 1 shows an embodiment of a high-frequency assembly in a schematic functional view.

DETAILED DESCRIPTION OF THE INVENTION in the following, reference is first made to FIG. 1, showing an embodiment of a high-frequency assembly. For the sake of conciseness, this embodiment is explained in greatest detail, while the description of the further embodiments is focused on the differences respectively particular aspects of the embodiments.

The high-frequency assembly 1 includes a waveguide cable with at least one polymer waveguide fiber (PMF) 11 as dielectric waveguide fiber.

Thee waveguide cable and accordingly the PMF 11 have a first end 111 and an opposed second end 112. Here and in the following it is exemplarily assumed that a signal is injected into the PMF 11 at the second end 112 as input respectively injection side and is transmitted respectively conducted in the PMF 11 as electromagnetic wave to the first end 111 as output respectively receiving side. The signal may be injected into the PMF 11 by any suitable high-frequency circuit or assembly (not shown). It is to be understood that the first end second end may be reversed in the PMF 11, the electromagnetic wave propagates with the fundamental mode HE11, having a first signal component that is polarized in a first direction (X) and a second signal component that is polarized in an orthogonal second direction (Y). The two signal components may be understood as two superimposed electromagnetic waves in the fundamental HE11 mode and the indicated polarization directions X, Y, respectively. The directions X, Y, are traverse to the propagation direction of the electromagnetic wave.

At the first end 111 of the PMF 11, a horn antenna 12, which may in particular be a circular horn antenna, is arranged. In some embodiments, the PMF has a circular cross section. However, other cross sections such as a rectangular cross sections may also be used. In any case, the PMF 11 and the horn antenna are matched appropriately.

Via the horn antenna 12 the electromagnetic wave of fundamental mode HE11 is transformed into an electromagnetic wave of fundamental mode TE10 at the output side of the horn antenna 12, having two orthogonal signal components of polarization directions X', Y'.

As explained in the general description, the signal components in the X-direction and the Y-direction at the first end 111 and accordingly also the signal components in the X'-direction and the Y' direction of the electromagnetic wave emitted by the horn antenna 12 are arbitrary.

The horn antenna 12 radiates its electromagnetic signal into an orthomode transducer 13 as generally known in the art. In the orthomode transducer, the signal is divided respectively split into its orthogonal components in the X'-direction and Y'-direction, respectively. Those signal components are separately fed into associated receiving circuits 141a, 141b. In the receiving circuits 141a, 141b, the signal is demodulated and converted into the digital domain. In a superimposing unit, 142, the output signals of the receiving are superimposed to improve signal to noise ratio before further processed.

Figure 2:
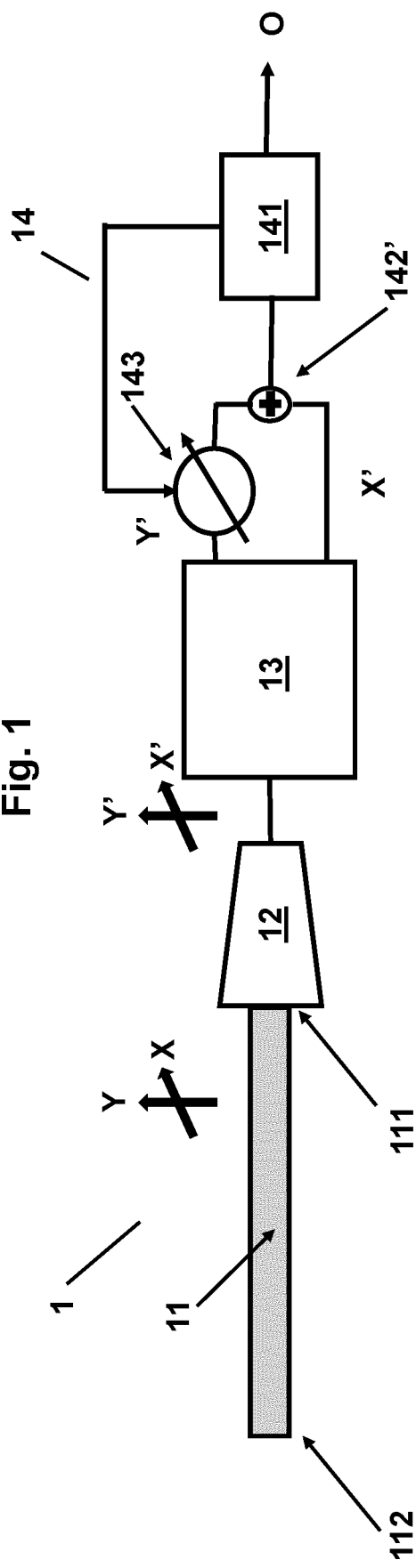
FIG. 2 shows a further embodiment of a high-frequency assembly in a schematic functional view.

In the following, reference is additionally made to FIG. 2. In the embodiment of FIG. 2, only a single receiving circuit 141 is present. The superimposition of the signal components is done between the output of the horn antenna 12 and the input of the receiving circuit 141. For this purpose, a superimposition unit 142' is provided that superimposes the signal components with polarization directions X', Y' of the fundamental mode TE 10 mode signal as emitted by the horn antenna 12. The output signal of the superimposing unit 142' is fed into the receiving circuit 141 as generally explained before. A phase shifting unit 143 is arranged in one of the two signal branch (in this example in the branch of for the signal component with Y'-polarization), thereby allowing the phasing between the signal components with X'-polarization and Y'-polarization to be adjusted. The phasing is controlled by the receiving circuit 141 such that the output level is always maximum.

In the following, reference is additionally made to FIG. 3. In the embodiment of FIG. 3, only a single receiving circuit 141 with a single input line is present, similar to the embodiment of FIG. 2. In the embodiment of FIG. 3, however, the two signal components with X'-polarization and Y'-polarization are not superimposed. Instead, a switching unit 144 is provided into which the two signal components are fed. Either of them is forwarded to the input of the receiving circuit 141, in dependence of the state of the switching 141. The switching unit 144 is controlled by the receiving circuit 144 to switch respectively toggle between the first signal component and the second signal component in dependence of a signal level threshold as explained in the general description. In a variant, the signal level threshold may be adaptively increased or decreased in dependence of the number of switching's in a specific time respectively time window.

In the following, reference is additionally made to FIG. 4. The embodiment of FIG. 4 is generally similar to the embodiment of FIG. 2. In contrast to the embodiment of FIG. 2, however, interface unit includes a dual polarization antenna 16 instead of the orthomode transducer 13. At the first end 111 of the PMF 11 respectively at the connection of the PMF 11 and the polarization antenna 16, a dielectric lens is 15 is arranged. It is noted that the dielectric lens, although it may help to increase the antenna efficiency and reduce RF-leakage, it may be omitted or exchanged by other RF energy focusing elements like tubular parts, directors, mirrors, and/or prisms.

The signal transmission from the dual polarization antenna 16 to the receiver circuit 141 is in this example realized by microstrip lines.

The invention claimed is:

1. A high-frequency assembly, including:
   a cable, the cable including at least one dielectric waveguide fiber with a first end and an opposed second end;
   a high-frequency circuit;
   an interface unit, wherein the at least one dielectric waveguide fiber is at the first end operatively coupled with the high-frequency circuit via the interface unit;
   wherein the interface unit is designed to inject a high-frequency signal into the dielectric waveguide fiber and/or to receive a high-frequency signal from the at least one dielectric waveguide fiber at the first end;
   wherein the high-frequency signal has a first signal component of a first polarization direction and a second signal component of a second polarization direction, wherein the high-frequency assembly is designed to inject the first signal component and the second signal component in a defined manner and/or to split a received high-frequency signal into the first signal component and the second signal component;
   wherein the at least one dielectric waveguide fiber is a polymeric microwave fiber (PMF); and
   wherein the high-frequency assembly is designed to evaluate a first signal level of the first signal component and a second signal level of the second signal component.

2. The high-frequency assembly according to claim 1, wherein the first polarization direction and the second polarization direction are orthogonal to each other.

3. The high-frequency assembly according to claim 1, wherein the interface unit includes an orthomode transducer or a dual polarization antenna.

4. The high-frequency assembly according to claim 1, wherein the high-frequency assembly includes a horn antenna and/or a dielectric lens arranged at the connection of the first end and the interface arrangement.

5. The high-frequency assembly according to claim 1, wherein the high-frequency assembly is configured to feed the first signal component only or the second signal component only into a receiving circuit independent of the first signal level and/or the second signal level.

6. The high-frequency assembly according to claim 5, wherein the high-frequency assembly is configured to switch from feeding the first signal component only into the receiving circuit to feeding the second signal component only into the receiving circuit if the signal level of the first signal component falls beyond a signal level threshold and to from feeding the second signal component only into the receiving circuit to feeding the first signal component only into the receiving circuit if the signal level of the second signal component falls beyond a signal level threshold.

7. The high-frequency assembly according to claim 1, wherein the high-frequency assembly is designed to generate a combined signal from the received first signal component and the received second signal component by superimposing the first signal component and the second signal component with an adjustable phasing such that a combined signal level of the combined signal is maximum.

8. The high-frequency assembly according to claim 1, wherein the high-frequency circuit includes a first receiving circuit and a second receiving circuit, wherein the high frequency assembly is configured to feed the first signal component into the first receiving circuit, and to separately feed the second signal component into the second receiving circuit, and to superimpose a first output signal of the first receiving circuit and a second output signal of the second receiving circuit.

9. The high-frequency assembly according to claim 1, wherein the high-frequency assembly is designed to determine a received signal level that is received at the second end and to control an amplitude and phase relation of the first signal component and the second signal component injected into the at least one dielectric waveguide fiber.

10. The high-frequency assembly according to claim 1, wherein the high-frequency assembly is configured to transmit and receive simultaneously in a polarization duplex operation mode by:
a receiving circuit evaluating an amplitude and phase relation of a first received signal and a second received signal at the first end, thereby determining a received effective polarization vector at the first end;
calculating an orthogonal polarization vector to this received effective polarization vector;
injecting a transmit signal into the at least one dielectric waveguide fiber at the first end, the transmit signal being polarized according to the orthogonal polarization vector.

11. A method for transmitting a high-frequency signal via at least one dielectric waveguide fiber of a cable, the dielectric waveguide fiber having a first end and an opposed second end, the method comprising:
injecting a high-frequency signal into the at least one dielectric waveguide fiber and/or to receiving a high-frequency signal from the at least one dielectric waveguide fiber at the first end,
wherein the high-frequency signal has a first signal component of a first polarization direction and a second signal component of a second polarization direction, wherein the method includes injecting the first signal component and the second signal component in a defined manner and/or splitting a received high-frequency signal into the first signal component and the second signal component;
wherein the at least one dielectric waveguide fiber is a polymeric microwave fiber PMF); and
wherein a high-frequency assembly is designed to evaluate a first signal level of the first signal component and a second signal level of the second signal component.

* * * * *